United States Patent
Lange

[15] 3,638,931
[45] Feb. 1, 1972

[54] PORTABLE HAND GUIDED CUTTING TORCH

[72] Inventor: Gerhardt Lange, Frankfurt am Main, Germany

[73] Assignee: Messer Griesheim GmbH, Frankfurt am Main, Germany

[22] Filed: Jan. 19, 1970

[21] Appl. No.: 3,831

[30] Foreign Application Priority Data

Feb. 11, 1969  Germany ..................... P 19 06 732.4

[52] U.S. Cl. ........................... 266/23 R, 266/23 K, 266/23 P
[51] Int. Cl. .................................................... B23k 7/10
[58] Field of Search ..................... 266/23 F, 23 K, 23 P, 23 R; 148/9

[56] References Cited

UNITED STATES PATENTS

| | | | |
|---|---|---|---|
| 1,370,882 | 3/1921 | Crandall | 266/23 F |
| 1,785,071 | 12/1930 | Coberly | 266/23 K X |
| 2,441,474 | 5/1948 | Deitrich | 266/23 K |
| 2,569,304 | 9/1951 | Gledhill | 266/23 F |

*Primary Examiner*—Frank T. Yost
*Attorney*—Ernest F. Marmorek

[57] ABSTRACT

A portable hand guided cutting torch comprising a handle, a guiding device connected to one end of the handle, a carriage carrying the torch and movable along the guiding device and a driving device connected to the carriage for driving same along the guiding device.

11 Claims, 4 Drawing Figures

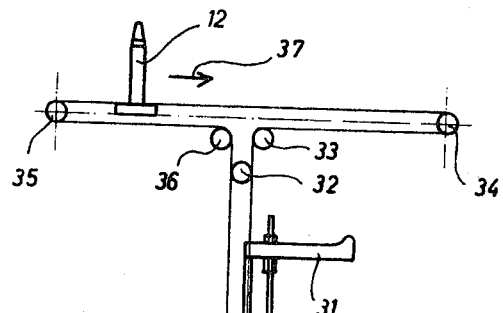
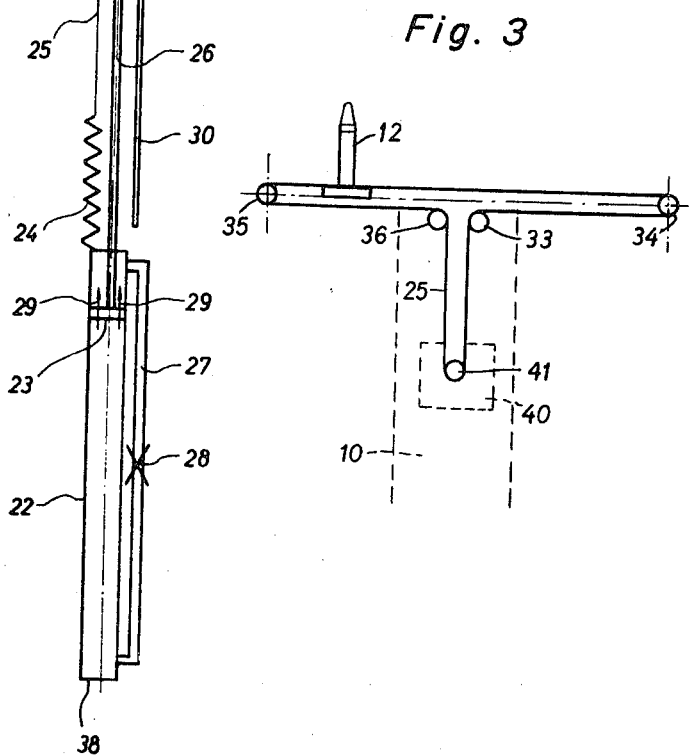
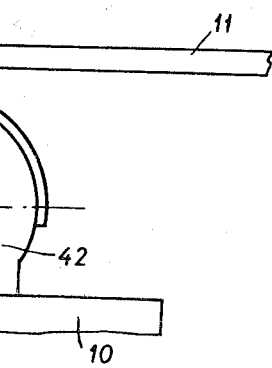

PORTABLE HAND GUIDED CUTTING TORCH

FIELD OF THE INVENTION

The present invention relates to a manually guided and operated portable torch cutting tool, especially for use in confined spaces or under strained conditions.

BACKGROUND OF THE INVENTION

Welding as well as cutting operations frequently have to be carried out in relatively narrow spaces and under strained circumstances. For example, in steel casting, risers have to be removed from workpieces, in steel construction, separation cuts in beams have to be performed. The same applies to construction of boilers, vessels, machines, ships, in finished structural elements and last but not least when installing or repairing railroad tracks. Such separating cuts are almost always carried out with manual cutting torches. As a consequence, the cutting surfaces frequently are not smooth and have to be subjected to a posttreatment, for instance by polishing. Such posttreatment is especially required in rail welding performed according to the well-known thermite or aluminothermic welding method since it requires perfect abutting surfaces.

Manually operable torch cutting apparatus or machines which are portable have become known. In principle, these machines consist of a housing movable on rails, the front of the housing carrying the cutting torch. The drive of the machine is effected by a motor, while the guiding or steering of the tool is effected by hand. Such manual cutting apparatus are, however, limited in their application in view of the great weight and in view of the fact that they require a sufficient supporting or guiding surface for the wheels of the housing. Consequently, such manual cutting apparatus have practically been used only for large-surface plates which preferably have to be arranged horizontally. If magnetic rollers are being provided for the rollers of the housing such apparatus can be used vertically, such as on vertical walls of ships. The just described apparatus, however, has hardly been used in practice. It must be assumed that they are too heavy and that their specific shape and construction limits their range of application considerably.

BRIEF SUMMARY OF THE INVENTION

It is, therefore, an object of the present invention to provide a portable hand guided cutting torch or tool, which will overcome the above-outlined disadvantages of prior art cutting tools.

It is a more specific object of the present invention to provide a portable hand guided cutting torch which is universally applicable and which can be used for cutting under constricted conditions.

The portable hand guided cutting torch according to the present invention is characterized primarily by a handle one end of which carries a transverse guiding device for the carriage of the cutting tool, and by means for driving the carriage along the guiding device.

BRIEF DESCRIPTION OF THE DRAWING

The invention is illustrated by way of example in the attached drawings, in which:

FIG. 2 illustrates one form of a drive for the cutting tool according to the present invention;

FIG. 3 illustrates another modification of the drive for the tool of FIG. 2; and FIG. 4 illustrates a ball pivot connection between the guiding means and the handle.

DETAILED DESCRIPTION OF A PREFERRED EMBODIMENT

Figure 1:
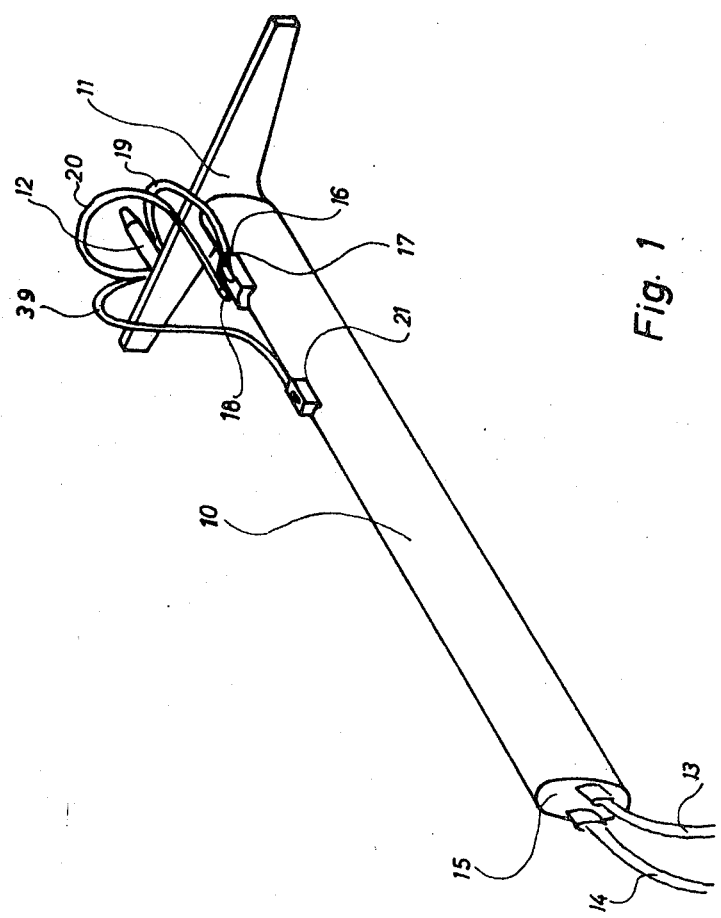
FIG. 1 illustrates the portable hand guided cutting tool according to the present invention.

Referring now to the drawing in detail, the manual cutting torch or cutting tool according to the present invention shown in FIG. 1 comprises a handle 10 which may have a length of approximately 32 inches. The front end of the handle is provided with a guiding device 11 for the carriage of the cutting tool generally identified with the reference numeral 12. The guiding device 11 is arranged perpendicularly to the handle 10 and is connected therewith in the center. It is, however, to be understood that the guiding device may be tiltably connected to the handle by a ball pivot 42, for example (FIG. 4), so that the torch 12 could move parallel to the longitudinal axis of the handle. The width of the guiding device 11 may, for instance, amount to approximately 12 inches. In this example, the cutting tool has a range of movement of approximately 12 inches which should be sufficient for approximately 90 percent of all required applications.

It is particularly advantageous to arrange the entire valve unit with its metering valves for the heating gas and heating oxygen within the handle. Furthermore, the heating gas conduit may lead to the valve block within the handle.

Since a movement of the cutting tool carriage has to be effected only when cutting oxygen is fed to the location where the cut is to be effected, in accordance with the present invention it is suggested that the valve for the cutting oxygen is to be actuated simultaneously with the advance switch arranged at the handle.

More specifically with respect to FIG. 1, heating gas is fed to the burner 12 through flexible conduits 13, 14 which lead to the rear end 15 of the handle 10. Conduits 13 and 14 are passed through the handle and are connected to a valve unit 16 containing the metering valves 17 and 18 for the heating gas and heating oxygen. Flexible conduits 19 and 20 for the heating gas and the heating oxygen lead from the valve unit 16 to the burner 12. A cutting oxygen valve (not shown) is arranged separately and is connected to a switch 21 for the advance of the torch. The cutting oxygen is fed to the torch 12 through a flexible conduit 39.

In accordance with the present invention, it is suggested to drive the carriage for the cutting torch in a manner known per se by a driving wheel 41 of an electromotor 40 (FIG. 3). However, in accordance with a preferred embodiment of the invention, a spring-biased hydraulic arrangement is used for driving the carriage. This drive is particularly advantageous when the handle is tubular and the spring-biased hydraulic drive is arranged within the handle.

The transmission of the driving force from the drive to the carriage can be effected via a steel band or wire. This type of transmission makes it easily possible to tilt the guiding device with respect to the handle, as has been mentioned above as one embodiment of the invention.

More specifically with reference to FIG. 2, the drive for the cutting tool 12 is arranged within the handle 10 and represents a spring-hydraulic drive. It consists of a piston 23 arranged in a cylinder 22, said piston being movable by a spring 24 which is connected to the piston 23 by means of a wire 25 and a piston rod 26. The cylinder 22 is filled with liquid on both sides of the piston 23, while the two cylinder chambers on opposite sides of the piston 23 are interconnected by means of a bypass conduit 27. A valve 28 is provided in bypass conduit 27 for interrupting the connection between the cylinder chambers, while the piston 23 is provided with a valve (not shown) which permits the flow of liquid only in the direction of the two arrows 29.

The operation of the cutting torch or tool is as follows: with valve 28 closed, the piston 23 is first moved by hand by means of a lever 31 sliding in a guiding means 30 in the direction opposite to the arrows 29 whereby the liquid contained in the cylinder 22 can flow unimpededly through the valve in the piston 23 in the direction of the arrows 29. During this movement the spring 24 is tensioned via the wire 25 passing over rollers 32, 33, 34, 35 and 36. Cutting tool 12 which is fixedly connected to the wire 25 is moved from the position shown in FIG. 2 in the direction of the arrow 37 into its starting position. The tensioning of spring 24 is completed when the piston 23 reaches the bottom 38 of the cylinder 22. A return of piston 23 by the tensioned spring 24 cannot take place at this time since the valve 28 is closed and the valve in the piston 23 does not permit fluid flow in a direction opposite to the arrows 29. A return of piston 23 is effected only after the valve 28 has been opened, the speed of return movement depending on the degree to which valve 28 has been opened. In this way the speed of movement of the cutting tool can be varied as desired.

Experience has shown that the portable hand guided cutting tool or torch according to the present invention can be held or kept so calmly, for instance by clamping the handle 10 under one arm, that smooth cutting surfaces are obtained. By holding the handle in a corresponding direction, such as in a vertical, horizontal or intermediate position, separating cuts can be achieved without difficulty at not easily accessible places.

Access can be made still easier by arranging the guiding device 11 pivotably with respect to handle 10, as outlined above.

While the invention has been explained and described with the aid of a particular embodiment thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

I claim:

1. A portable hand guided cutting torch apparatus comprising:
a handle, elongated guiding means secured to one end of and extending across said handle, a torch, a carriage carrying said torch and being supported for movement along said guiding means, and driving means operable for moving said carriage along said guiding means and across said handle.

2. The torch according to claim 1, wherein said guiding means is pivotably connected to said handle.

3. The torch according to claim 1, wherein said driving means comprises an electromotor.

4. The torch according to claim 1, wherein said driving means comprises a combined spring and hydraulic drive.

5. The torch according to claim 4, wherein said handle has a tubular cross section and wherein said combined spring and hydraulic drive is arranged within said handle.

6. The torch according to claim 5, wherein said drive includes a wire connection between said carriage and said combined spring and hydraulic drive.

7. The torch according to claim 1, which includes a valve unit with metering valves for heating gas and heating oxygen within said handle.

8. The torch according to claim 7, which includes carriage advance control means at said handle and a valve actuable together with said switch for controlling the supply of cutting oxygen to said torch.

9. The torch according to claim 7, which includes conduit means for oxygen and heating gas leading to said valve unit and arranged within said handle.

10. The torch according to claim 1 further comprising flexible gas conduits connecting said torch with said handle.

11. A portable hand guided cutting tool comprising: a handle having a tubular cross section, guiding means connected to one end of said handle, a carriage carrying said torch and movable along said guiding means, a hydraulic cylinder arranged within said handle, a piston slidably arranged within said cylinder and together with said cylinder defining chambers on opposite sides of said piston, a piston rod connected to said piston and projecting from one end of said cylinder, a bypass conduit interconnecting said two chambers, a valve provided in said bypass conduit for controlling the flow therethrough, check valve means in said piston permitting fluid flow in one direction only, means connecting said cylinder to said carriage and said piston rod and including spring means interposed between said cylinder and said carriage, whereby when said two chambers are filled with fluid and said valve is closed said piston can be moved to one end of said cylinder while tensioning said spring means and moving said carriage to one end of said guiding means and whereby upon opening of said valve said spring means relaxes while moving said carriage along said guiding means to the other end thereof.

* * * * *